(12) United States Patent
Wu

(10) Patent No.: US 11,904,662 B2
(45) Date of Patent: Feb. 20, 2024

(54) THERMAL INSULATION DEVICE

(71) Applicant: Po-Tsun Wu, Tainan (TW)

(72) Inventor: Po-Tsun Wu, Tainan (TW)

( * ) Notice: Subject to any disclaimer, the term of this patent is extended or adjusted under 35 U.S.C. 154(b) by 0 days.

(21) Appl. No.: 17/888,914

(22) Filed: Aug. 16, 2022

(65) Prior Publication Data
US 2023/0056165 A1 Feb. 23, 2023

(30) Foreign Application Priority Data

Aug. 19, 2021 (TW) .................................. 110130734

(51) Int. Cl.
| | | |
|---|---|---|
| *B32B 3/24* | (2006.01) | |
| *B60J 1/20* | (2006.01) | |
| *F16L 59/08* | (2006.01) | |
| *F16L 59/06* | (2006.01) | |
| *B60R 13/08* | (2006.01) | |
| *B32B 3/26* | (2006.01) | |
| *B32B 27/36* | (2006.01) | |
| *B32B 27/30* | (2006.01) | |
| *B32B 9/00* | (2006.01) | |
| *B32B 27/08* | (2006.01) | |
| *B32B 9/04* | (2006.01) | |

(52) U.S. Cl.
CPC ............. *B60J 1/2011* (2013.01); *B32B 3/266* (2013.01); *B32B 9/005* (2013.01); *B32B 9/045* (2013.01); *B32B 27/08* (2013.01); *B32B 27/304* (2013.01); *B32B 27/36* (2013.01); *B32B 27/365* (2013.01); *B60R 13/0815* (2013.01); *F16L 59/06* (2013.01); *F16L 59/08* (2013.01); *B32B 2307/304* (2013.01); *B32B 2307/732* (2013.01); *B32B 2605/006* (2013.01)

(58) Field of Classification Search
CPC .................................................. B60R 13/0815
See application file for complete search history.

(56) References Cited

U.S. PATENT DOCUMENTS

| | | | | |
|---|---|---|---|---|
| 4,399,347 A | * | 8/1983 | Schmitt ................... | B60J 11/08 52/171.2 |
| 4,909,044 A | * | 3/1990 | Gudmundsen ..... | B60H 1/00007 62/236 |
| 2004/0222671 A1 | * | 11/2004 | Nagayama .......... | B60R 13/0815 296/211 |

* cited by examiner

*Primary Examiner* — William P Watkins, III

(57) ABSTRACT

A thermal insulation device includes a film unit including inner and outer layers and a thermal insulation unit. The outer layer is mounted to a window of a vehicle. The inner layer has a peripheral portion connected sealingly to the outer layer, and a center portion spaced apart from and cooperating with the outer layer to define a thermal insulation space therebetween. The film unit is formed with inlet holes communicating with the thermal insulation space and a seating space of the vehicle, and outlet holes communicating with the thermal insulation space and open toward the bodyshell, such that air in the seating space flows into the thermal insulation space through the inlet holes and is discharged from the thermal insulation space toward the bodyshell through the outlet holes. The thermal insulation unit includes a heat insulation layer disposed on the outer layer.

10 Claims, 9 Drawing Sheets

THERMAL INSULATION DEVICE

CROSS-REFERENCE TO RELATED APPLICATION

This application claims priority of Taiwanese Invention Patent Application No. 110130734, filed on Aug. 19, 2021.

FIELD

The disclosure relates to a thermal insulation device, and more particularly to a thermal insulation device adapted to be mounted on a vehicle.

BACKGROUND

In general, a black body radiation of a window glass of a car, which is also known as an emissivity of the window glass after being exposed to sunlight, is about 0.84. When sunlight hits the car window, a portion of the sunlight is reflected back directly, another portion of the sunlight enters into an interior space of the car through the window glass, and a remaining portion of the sunlight, e.g., 84% of the sunlight, is absorbed by the window glass as radiant heat. Next, the radiant heat absorbed by the window glass will also radiate into the interior space of the car and then out of the car. As a result, temperature inside the car will rise. In response to the rising temperature, some manufacturers or car owners would attach a conventional thermal insulation film to the window glass for shielding against the sunlight. However, performance of the conventional thermal insulation film is generally unsatisfactory because heat absorbed by the conventional thermal insulation film may also radiate into the interior space of the car.

SUMMARY

Therefore, an object of the disclosure is to provide a thermal insulation device capable of alleviating at least one of the drawbacks of the prior art.

According to an aspect of the disclosure, a thermal insulation device is adapted to be mounted to a vehicle. The vehicle defines a seating space therein and includes a vehicle body. The vehicle body includes a bodyshell and a window that is mounted to the bodyshell. The thermal insulation device includes a film unit and a thermal insulation unit. The film unit is adapted to be mounted to the vehicle body for covering an inner surface of the window that faces the seating space, is light transmissive, and includes an outer layer and an inner layer. The outer layer is adapted to be mounted to the inner surface of the window. The inner layer is mounted to the outer layer such that the outer layer is disposed between the inner layer and the window. The inner layer has a peripheral portion connected sealingly to the outer layer, and a center portion spaced apart from and cooperating with the outer layer to define a thermal insulation space therebetween. The film unit is formed with a plurality of inlet holes that are in spatial communication with the thermal insulation space and that are adapted to communicate with the seating space, and a plurality of outlet holes that are in spatial communication with the thermal insulation space, that are disposed above the inlet holes, and that are adapted to be open toward the bodyshell, such that air in the seating space flows into the thermal insulation space through the inlet holes and is discharged from the thermal insulation space toward the bodyshell through the outlet holes, so as to ventilate the thermal insulation space. The thermal insulation unit includes a heat insulation layer that is disposed on a side surface of the outer layer facing the thermal insulation space, and that is adapted to reflect and absorb heat conducted from the window.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
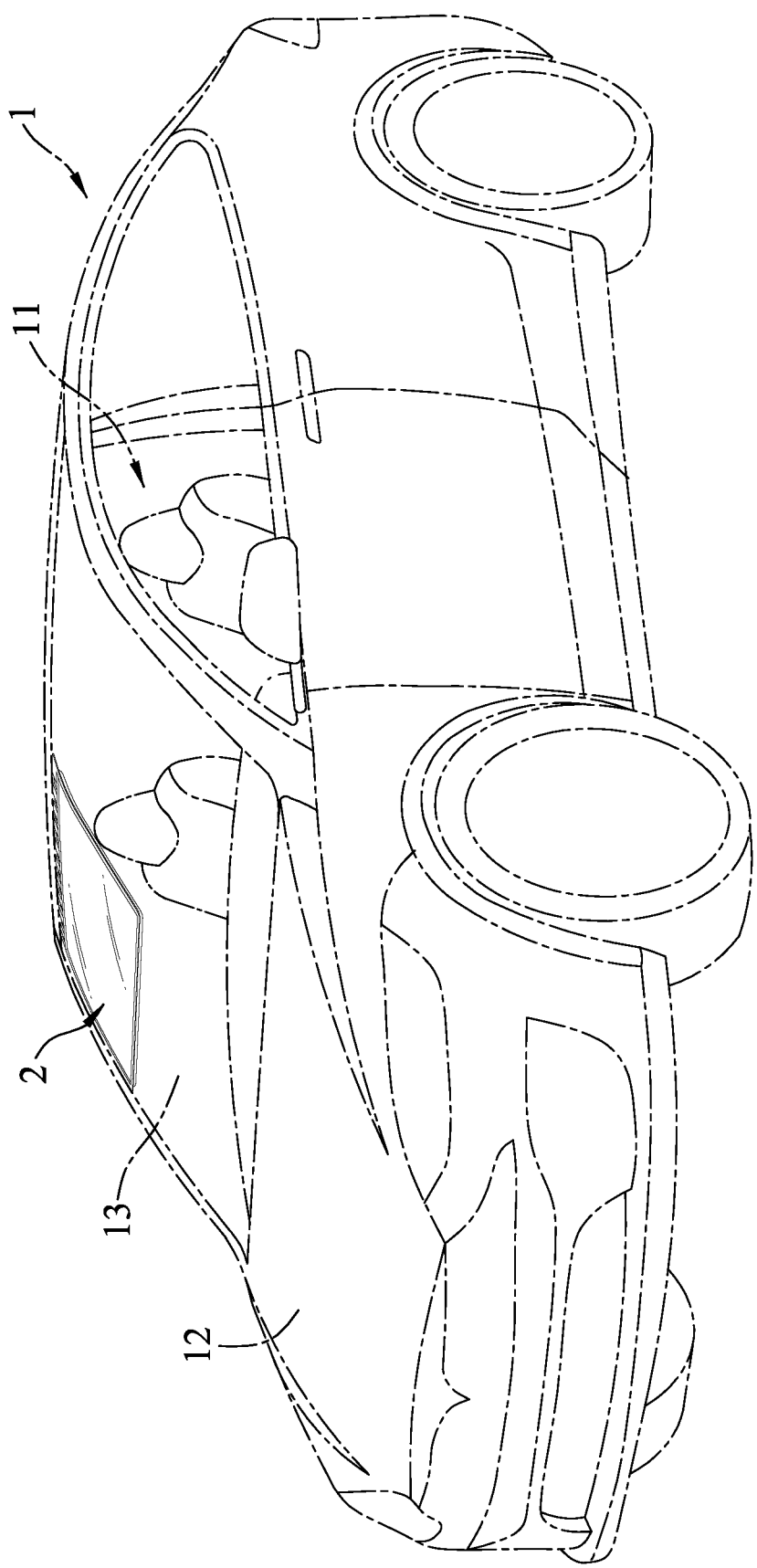
FIG. 1 is a schematic perspective view of a first embodiment of a thermal insulation device according to the present disclosure being mounted to a vehicle.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, a first embodiment of a thermal insulation device 2 according to the present disclosure is adapted to be mounted to a vehicle 1. The vehicle 1 defines a seating space 11 therein, and includes a vehicle body 12 and a window 13. The vehicle body 12 includes a bodyshell 121 (see FIG. 3) made of metal and a car interior 122 made of a foam material and cooperating with the bodyshell 121 to define a gap 123 therebetween. The window 13 is mounted to the bodyshell 121, and can be a front windshield, a rear windshield, a panoramic windshield, a side window or a skylight window. In this embodiment, the window 13 is a panoramic windshield. The thermal insulation device 2 includes a film unit 3 and a thermal insulation unit 4.

The film unit 3 is adapted to be mounted to the vehicle body 12 for covering an inner surface of the window 13, which faces the seating space 11, and is light transmissive. Specifically, as shown in FIG. 1, a right side and an upper side of the film unit 3 are inserted into the gap 123 and clamped between the bodyshell 121 and the car interior 122 by a user sitting in the seating space 11, and can be mounted to the bodyshell 121 by means of hanging, adhering, fastening, etc. It should be noted that, in this embodiment, the thermal insulation device 2 is rectangular and is mounted in front of a front passenger seat of the vehicle 1. However, the shape and the mounting position of the insulation device 2 are not limited to this example.

Figure 2:
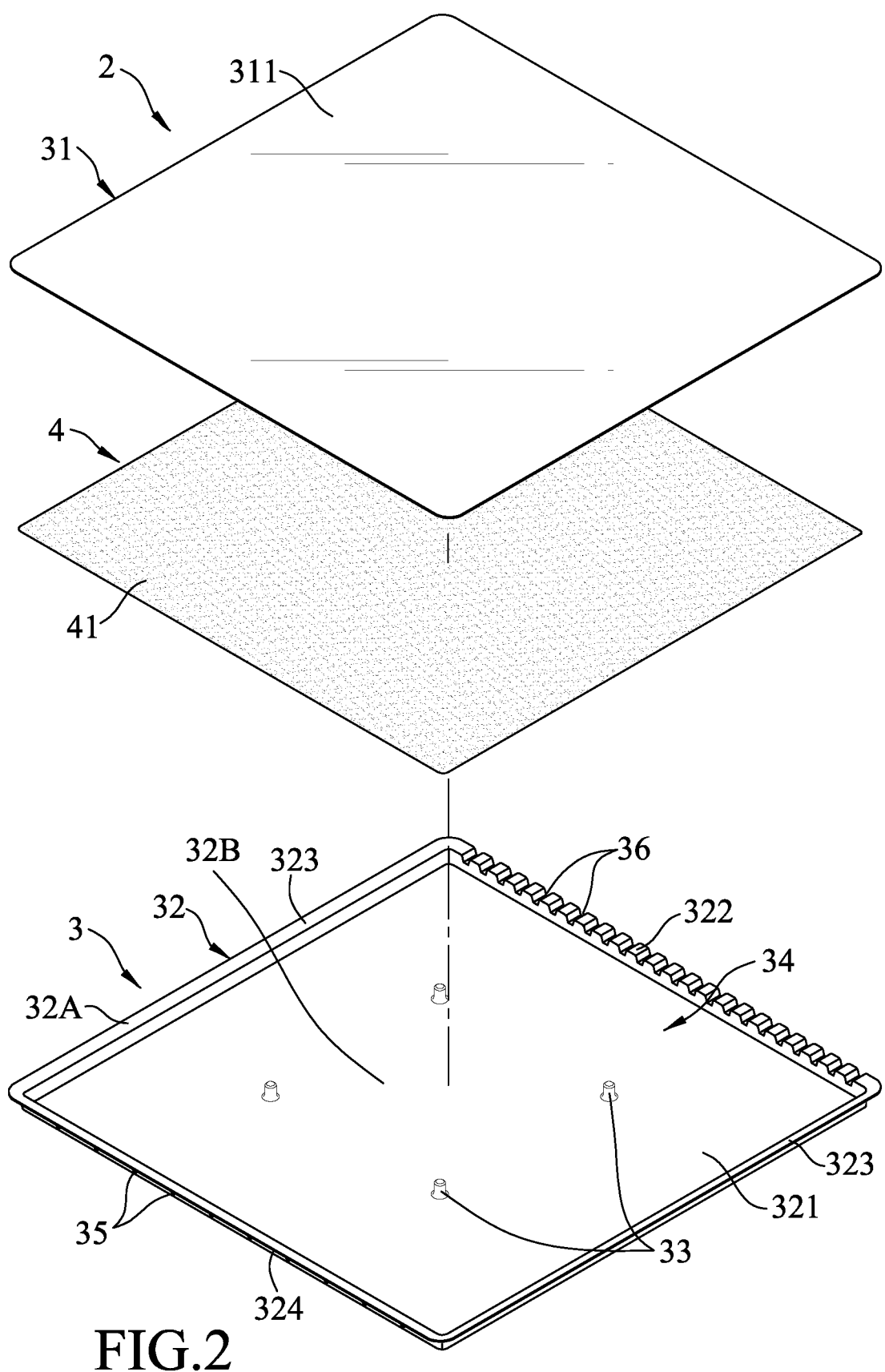
FIG. 2 is an exploded perspective view of the first embodiment.
Figure 3:
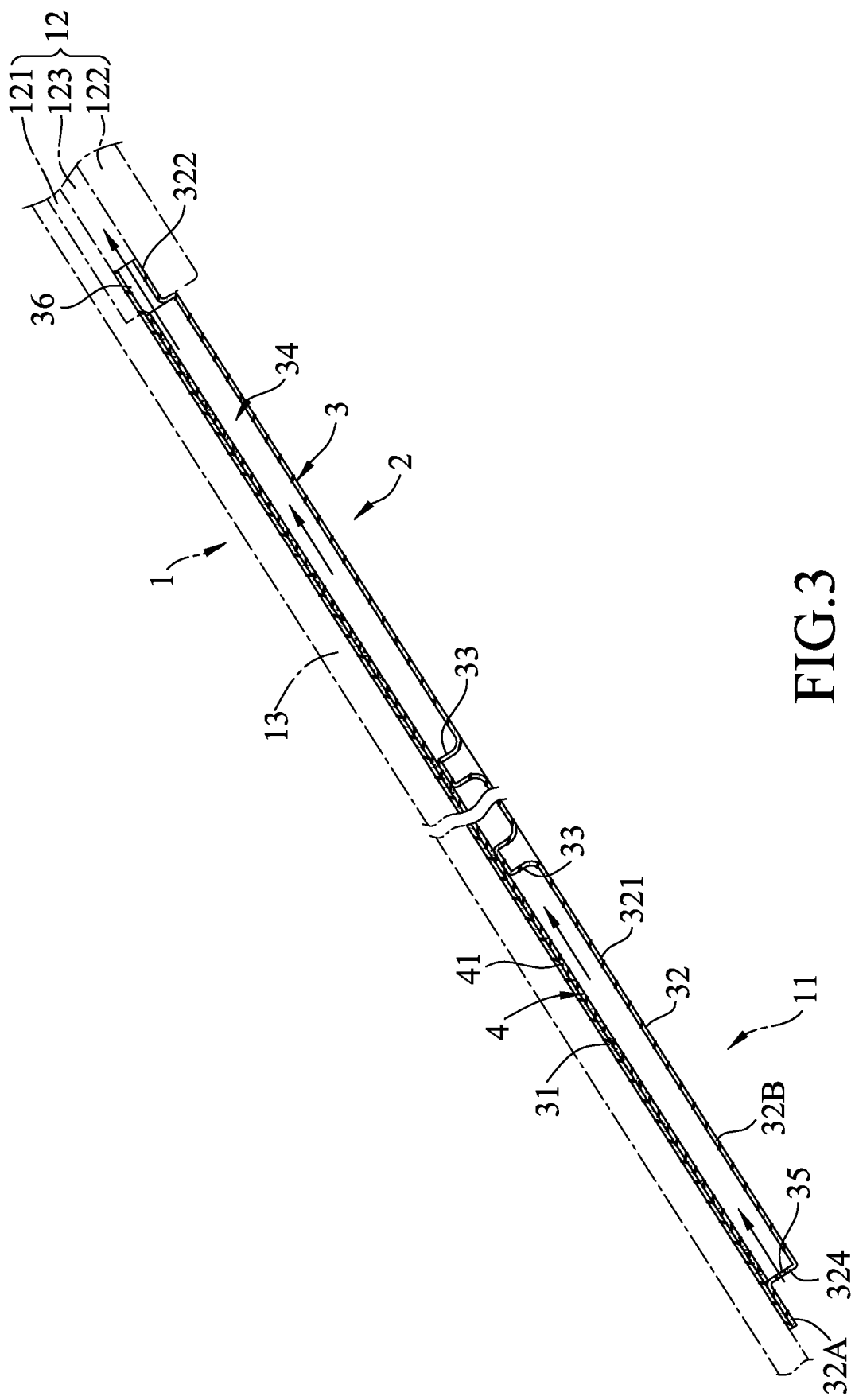
FIG. 3 is a fragmentary schematic sectional view of the first embodiment.

The film unit 3 includes an outer layer 31, an inner layer 32, and four supporting pillars 33. The outer layer 31 is adapted to be mounted to the inner surface of the window 13. The inner layer 32 is mounted to the outer layer 31 such that the outer layer 31 is disposed between the inner layer 32 and the window 13, and has a peripheral portion 32A that is connected sealingly to the outer layer 31 and a center portion 32B that is spaced apart from and that cooperates with the outer layer 31 to define a thermal insulation space 34 therebetween. The supporting pillars 33 are disposed between the outer layer 31 and the center portion 32B of the inner layer 32 to separate the outer layer 31 from the center portion 32B of the inner layer 31. The outer layer 31 has an outer surface 311 that is planar and that is adapted to face and adjoin the window 13. As shown in FIG. 2, the inner layer 32 is configured as an indented plate and has a rectangular central wall 321, a toothed upper side wall 322 extending from an upper side of the central wall 321 toward the outer layer 31 and then bent in a direction parallel to the central wall 321, a lower side wall 324 extending from a lower side of the central wall 321 toward the outer layer 31 and then bent in a direction parallel to the central wall 321, and two lateral walls 323, which extend respectively from left and right sides of the central wall 321 toward the outer layer 31 and then bent in a direction parallel to the central wall 321 and each of which interconnects to a respective one of two opposite ends of the upper side wall 322 and a respective one of two opposite ends of the lower side wall 324. In this embodiment, the supporting pillars 33 are formed integrally with the central wall 321 and extend toward the outer layer 31. It should be noted that the number of the supporting pillars 33 is not limited to four, and may be one or any number more than one. Each of the outer layer 31 and the inner layer 32 is made of one of polycarbonate (PC), polyethylene terephthalate (PET), tantalum carbide (TAC), polyvinyl chloride PVC and a combination thereof. In this embodiment, each of the outer layer 31 and the inner layer 32 is made of PC and has a thickness ranging from 0.1 mm to 2 mm. In one embodiment, the thickness of each of the outer layer 31 and the inner layer 32 is 0.5 mm.

Figure 4:
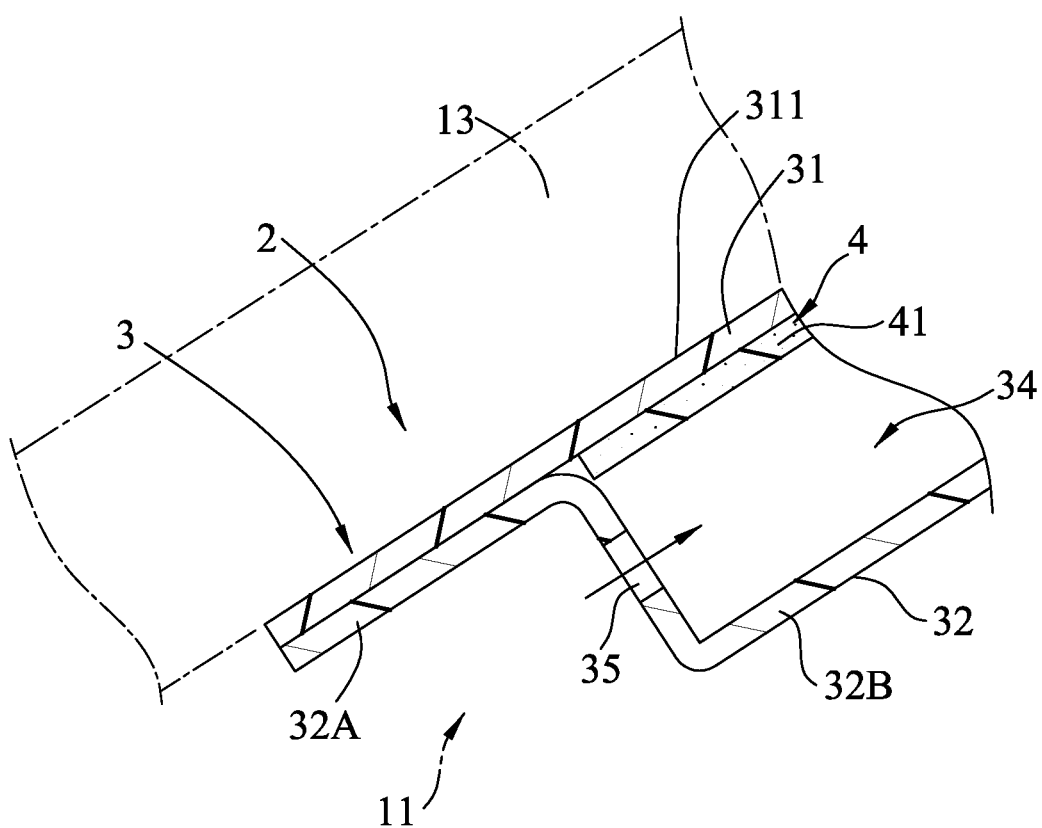
FIG. 4 is a fragmentary schematic sectional view illustrating an inlet hole formed in a film unit of the first embodiment.

By virtue of the abovementioned structure, the outer layer 31 cooperates with the inner layer 32 to define the thermal insulation space 34 therebetween. The film unit 3 is formed with a plurality of inlet holes 35 that are in spatial communication with the thermal insulation space 34 and that are adapted to communicate with the seating space 11, and a plurality of outlet holes 36 that are in spatial communication with the thermal insulation space 34, that are disposed above the inlet holes 35, and that are adapted to be open toward the bodyshell 121, such that air in the seating space 11 can flow into the thermal insulation space 34 through the inlet holes 35 and be discharged from the thermal insulation space 34 toward the bodyshell 12 through the outlet holes 36, so as to ventilate the thermal insulation space 34. As shown in FIG. 4, in this embodiment, the inlet holes 35 are formed in the lower side wall 324, each of the inlet holes 35 has a uniform diameter, and the outlet holes 36 are defined by the upper side wall 322 and the outer layer 31. Since the upper side wall 322 and a portion of the outer layer 31 are inserted into the gap 123, the outlet holes 36 are in spatial communication with the gap 123. It should be noted that the configuration of the outer layer 31 and the upper side wall 322 may be modified as long as the outlet holes 36 are formed adjacent to the gap 123 and open toward the bodyshell 121 to transfer heat thereto. In addition, the positions of the upper side wall 322 and the lower side wall 324 are interchangeable, and the configurations of the upper side wall 322 and the lower side wall 324 may also be modified. In this embodiment, the film unit 3 is adapted to be inclinedly mounted in the vehicle body 12, and the outlet holes 36 are disposed higher than the inlet holes 35.

The thermal insulation unit 4 includes a heat insulation layer 41 that is disposed on a side surface of the outer layer 31 facing the thermal insulation space 34, and that is adapted to reflect and absorb heat conducted from the window 13. The heat insulation layer 41 is made of one of tungsten oxide nanowires, zinc oxide nanowires, and a combination thereof. However, the heat insulation layer 41 is not limited to the examples described herein and can be a commercially available optical film or sun control film.

When sunlight hits the window 13 of the vehicle 1, a portion of the sunlight is reflected back, yet another portion of the sunlight enters through the window 13, radiates into the thermal insulation device 2 and generates heat energy therein, which will be reflected again and absorbed by the insulation layer 41. The heat absorbed by the insulation layer 41 will also radiate into the thermal insulation space 34 so the temperature in the thermal insulation space 34 will increase. The air in the seating space 11 will flow into the thermal insulation space 34 through the inlet holes 35 to cool down the temperature in the thermal insulation space 34 and be discharged from the thermal insulation space 34 toward the gap 123 through the outlet holes 36 so that the thermal insulation space 34 will be ventilated and the heat conducted to the body shell 121 will be dissipated quickly.

Figure 5:
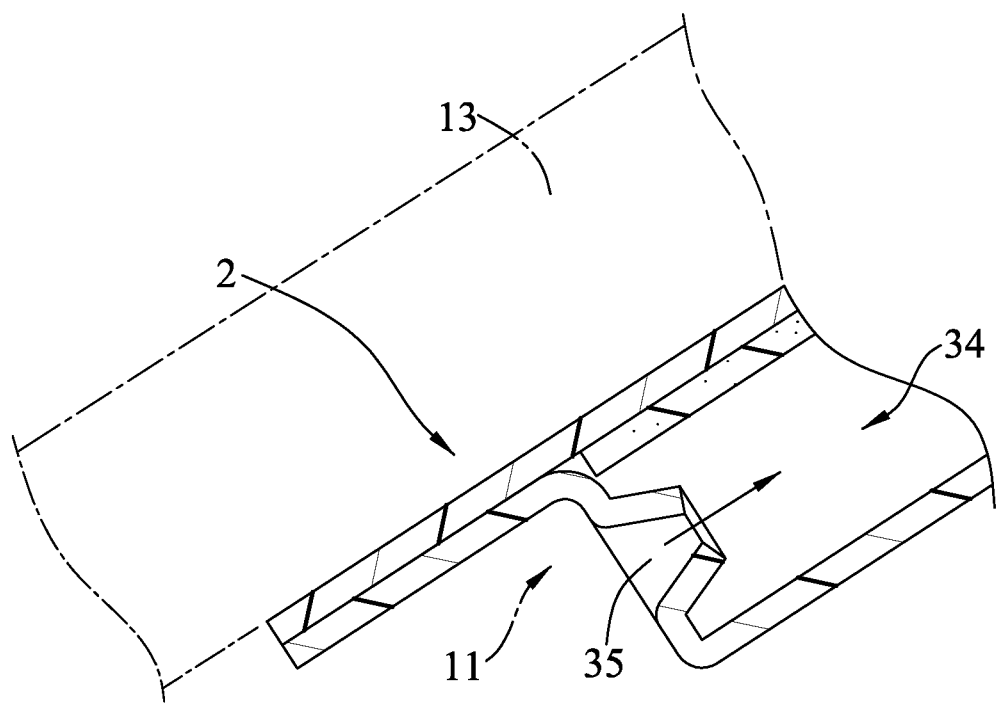
FIG. 5 is a fragmentary schematic sectional view illustrating the inlet hole of a second embodiment of the thermal insulation device according to the present disclosure.

Referring to FIG. 5, a second embodiment of the thermal insulation device according to the present disclosure is similar to the first embodiment, and the difference therebetween resides in the shape of the inlet holes 35. In the second embodiment, each of the inlet holes 35 is frustoconical, and has an inner end that is proximate to the thermal insulation space 34 and an outer end that is distal from the thermal insulation space 34 and that has a diameter greater than that of the inner end. Thus, air in the seating space 11 may smoothly flow into the thermal insulation space 34 while the air in the thermal insulation space 34 is prevented from flowing reversely into the seating space 11 through the inlet holes 35.

Figure 6:
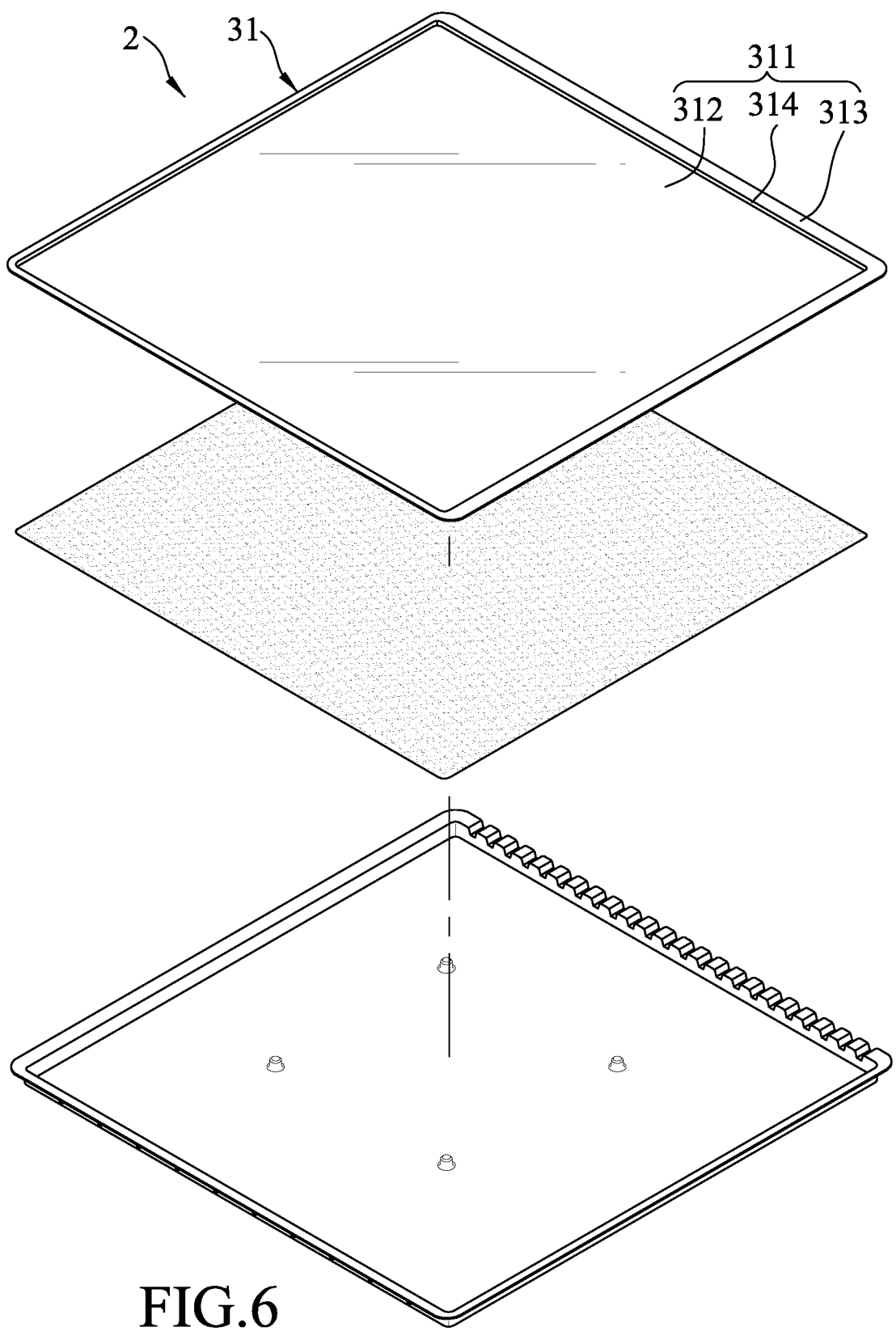
FIG. 6 is an exploded perspective view illustrating a third embodiment of the thermal insulation device according to the present disclosure.
Figure 7:
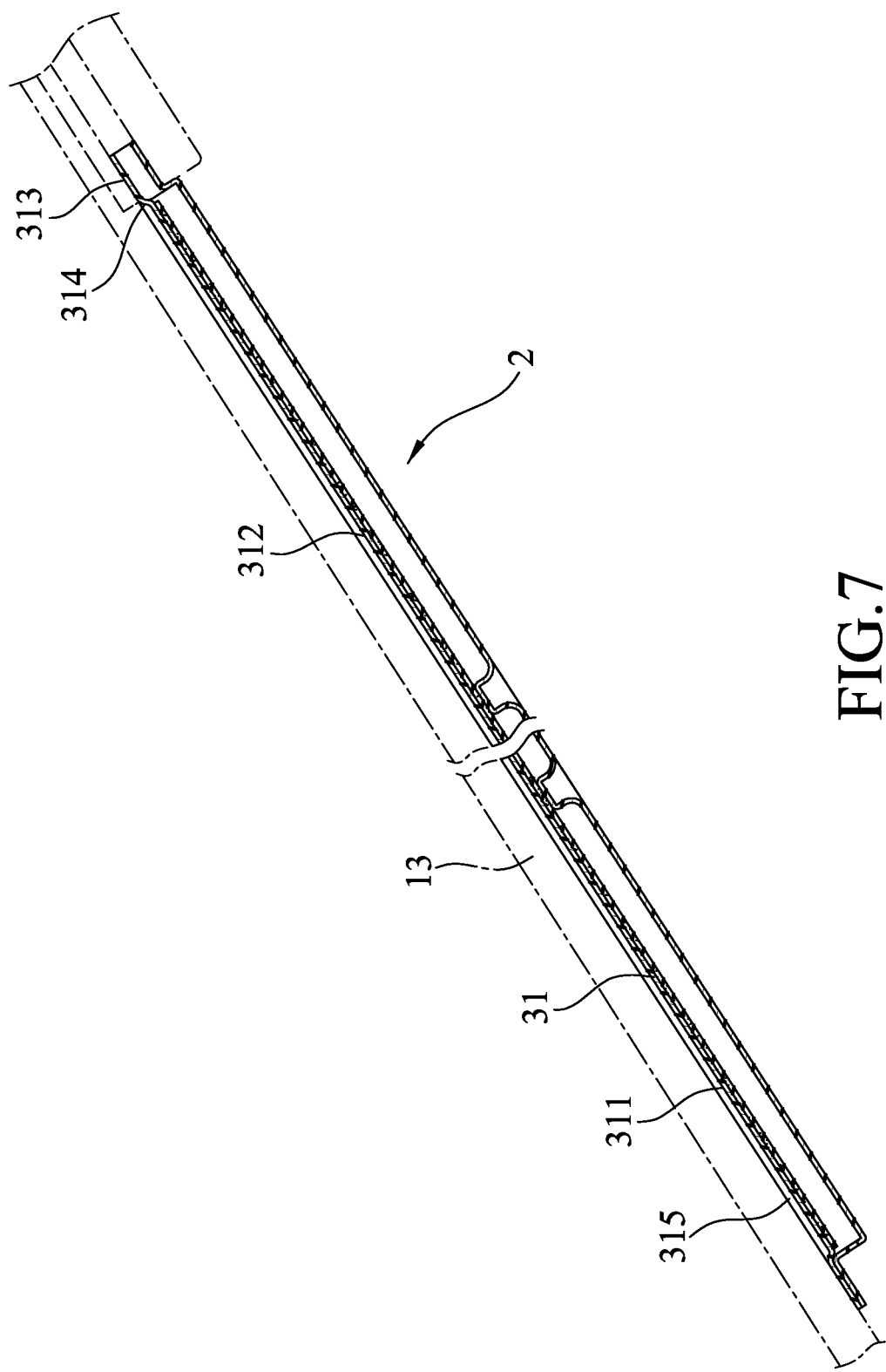
FIG. 7 is a fragmentary schematic sectional view of the third embodiment.
Figure 8:
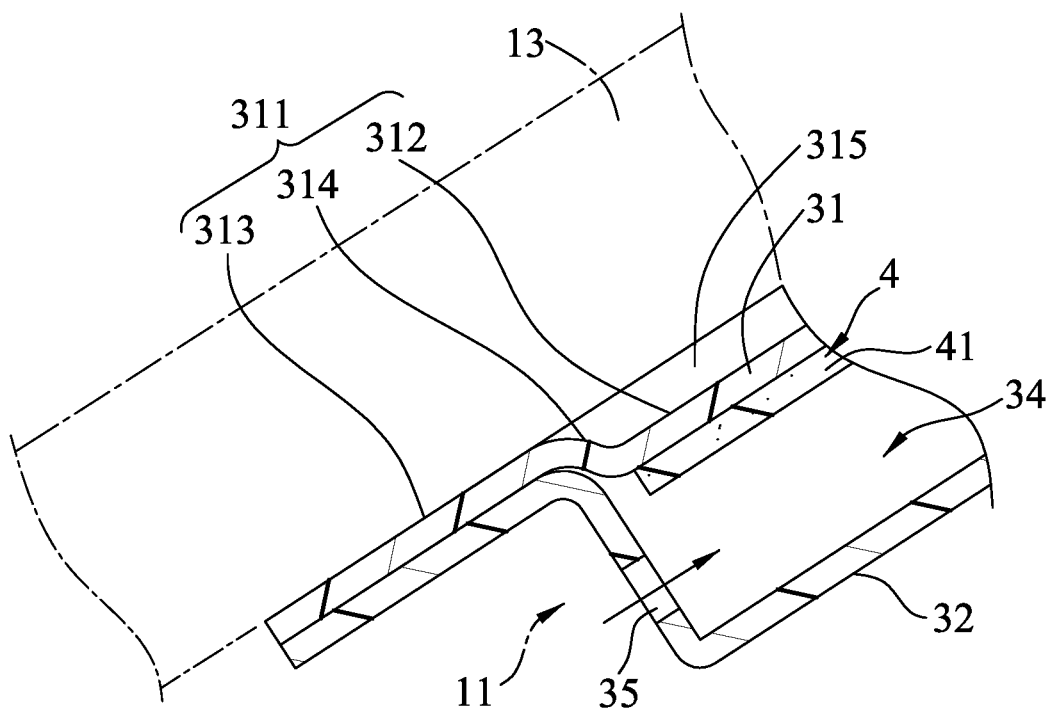
FIG. 8 is a fragmentary schematic sectional view illustrating the film unit and a thermal insulation unit of the third embodiment.

Referring to FIGS. 6 to 8, a third embodiment of the thermal insulation device according to the present disclosure is similar to the first embodiment, and the differences therebetween reside in the following. In the third embodiment, the outer layer 31 has an indented outer surface 311 adapted to face the window 13 and having a peripheral portion 313 and a central portion 312. The peripheral portion 313 is adapted to abut against the window 13. The central portion 312 is adapted to be spaced apart from and cooperates with the window 13 to define a room 315 therebetween. By virtue of the structure of the outer layer 31, a contact area between the window 13 and the outer layer 31 is reduced so that wear on the outer layer 31 can also be reduced. In addition, the room 315 can reduce heat conducted and radiated from the window 13 to the seating space 11 so that the performance of the heat insulation device 2 can be enhanced.

Figure 9:
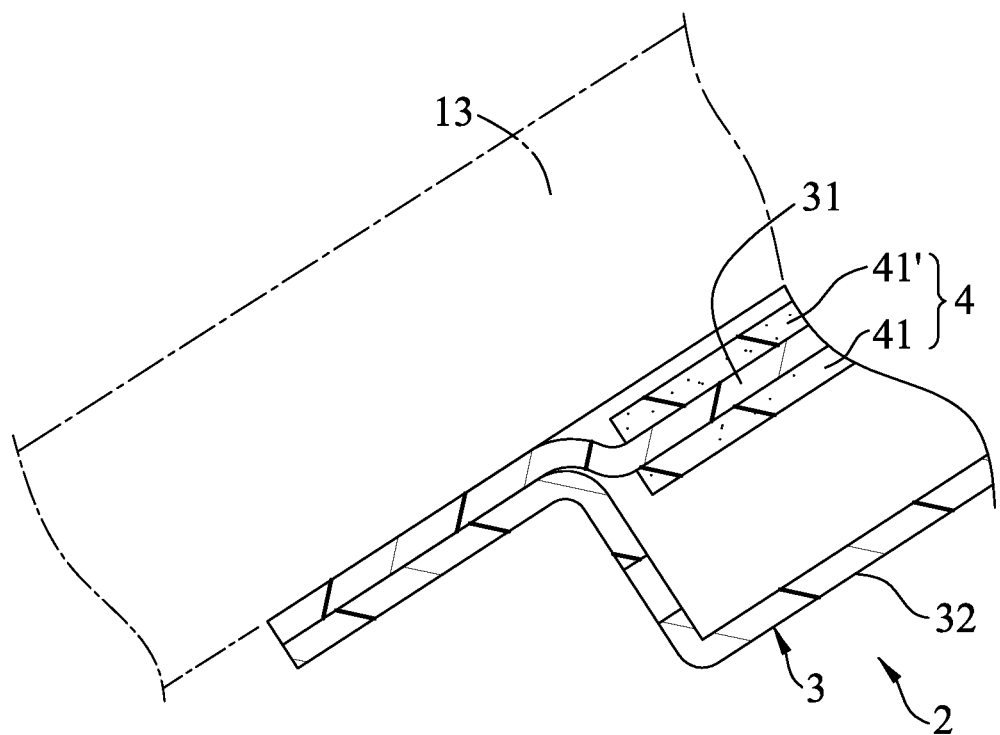
FIG. 9 is a fragmentary schematic sectional view illustrating the film unit and the thermal insulation unit of a fourth embodiment of the thermal insulation device according to the present disclosure.

Referring to FIG. 9, a fourth embodiment of the thermal insulation device according to the present disclosure is similar to the third embodiment, and the difference therebetween resides in the following. In the fourth embodiment, the thermal insulation unit 4 further includes an auxiliary heat insulation layer 41' that is disposed in the room 315 and on a side surface of the outer layer 31 facing away from the heat insulation layer 41, and that is adapted to reflect and absorb heat conducted from the window 13. This way, the performance of the heat insulation device 2 can be further enhanced. It should be noted that the auxiliary heat insulation layer 41' may be applied on the side surface of the outer layer 31 facing away from the heat insulation layer 41 by a known processing method such that the outer layer 31 is sandwiched between the heat insulation layer 41 and the auxiliary heat insulation layer 41'.

To sum up, by virtue of the heat insulation device 2 that is mounted to the vehicle body 12 for covering the inner surface of the window 13, the thermal insulation unit 4 of the heat insulation device 2 can effectively reflect and absorb heat conducted from the window 13. Furthermore, the heat absorbed by the thermal insulation unit 4 can also be dissipated toward the bodyshell 121 through the thermal insulation space 34, which can prevent the temperature in the seating space 11 from rising, and in turn can reduce the use of air conditioning.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A thermal insulation device adapted to be mounted to a vehicle, the vehicle defining a seating space therein and including a vehicle body that includes a bodyshell and a window that is mounted to the bodyshell, said thermal insulation device comprising:
    a film unit being adapted to be mounted to the vehicle body for covering an inner surface of the window that faces the seating space, being light transmissive, and including an outer layer which is adapted to be mounted to the inner surface of the window, and an inner layer which is mounted to said outer layer such that said outer layer is disposed between said inner layer and the window, and which has a peripheral portion connected sealingly to said outer layer and a center portion spaced apart from and cooperating with said outer layer to define a thermal insulation space therebetween, said film unit being formed with a plurality of inlet holes that are in spatial communication with said thermal insulation space and that are adapted to communicate with the seating space, and a plurality of outlet holes that are in spatial communication with said thermal insulation space, that are disposed above said inlet holes, and that are adapted to be open toward the bodyshell, such that air in the seating space flows into said thermal insulation space through said inlet holes and is discharged from said thermal insulation space toward the bodyshell through said outlet holes, so as to ventilate said thermal insulation space; and
    a thermal insulation unit including a heat insulation layer that is disposed on a side surface of said outer layer facing said thermal insulation space, and that is adapted to reflect and absorb heat conducted from the window.

2. The thermal insulation device as claimed in claim 1, wherein said film unit further includes at least one supporting pillar disposed between said outer layer and said center portion of said inner layer to separate said outer layer from said center portion of said inner layer.

3. The thermal insulation device as claimed in claim 1, wherein said outer layer has an outer surface being planar and adapted to face and adjoin the window.

4. The thermal insulation device as claimed in claim 1, wherein said outer layer has an outer surface adapted to face the window and having a peripheral portion that is adapted to abut against the window and a central portion that is adapted to be spaced apart from and cooperate with the window to define a room therebetween for reducing heat transfer and radiation from the window.

5. The thermal insulation device as claimed in claim 1, wherein each of said inlet holes has a uniform diameter.

6. The thermal insulation device as claimed in claim 1, wherein each of said inlet holes is frustoconical, and has an inner end proximate to said thermal insulation space, and an outer end distal from said thermal insulation space and having a diameter greater than that of said inner end.

7. The thermal insulation device as claimed in claim 1, wherein said thermal insulation unit further includes an auxiliary heat insulation layer that is disposed in said room and on a side surface of said outer layer facing away from said heat insulation layer, and that is adapted to reflect and absorb heat conducted from the window.

8. The thermal insulation device as claimed in claim 1, wherein each of said outer layer and said inner layer is made of one of polycarbonate (PC), polyethylene terephthalate (PET), tantalum carbide (TAC), polyvinyl chloride (PVC) and a combination thereof.

9. The thermal insulation device as claimed in claim 1, wherein each of said outer layer and said inner layer has a thickness ranging from 0.1 mm to 2 mm.

10. The thermal insulation device as claimed in claim 1, wherein said heat insulation layer is made of one of tungsten oxide nanowires, zinc oxide nanowires and a combination thereof.

* * * * *